UNITED STATES PATENT OFFICE.

BURT E. DUNN, OF MUNCIE, INDIANA, ASSIGNOR TO DUNN'S WHOLE MILK BUTTER-MILK COMPANY, INC., OF MUNCIE, INDIANA, A CORPORATION OF INDIANA.

METHOD OF MAKING A WHOLE-MILK PRODUCT.

1,143,516.

Specification of Letters Patent. Patented June 15, 1915.

No Drawing. Application filed August 11, 1914. Serial No. 856,238.

*To all whom it may concern:*

Be it known that I, BURT E. DUNN, a citizen of the United States, residing at Muncie, in the county of Delaware and State of Indiana, have invented new and useful Improvements in Methods of Making a Whole-Milk Product, of which the following is a specification.

The present invention relates to a milk product particularly suitable for use by invalids, or other persons having weak digestion, which also will be suitable for use as a general beverage, which shall have a flavor similar to buttermilk but which production will be materially more nourishing than buttermilk since it contains all the ingredients of the whole milk. This material also will be as easy to digest as buttermilk, and on account of the fact that it contains all the fat of the original milk will be more nourishing than ordinary buttermilk.

In producing this beverage I may start with sour milk, containing up to about .6 % of lactic acid or if sour milk is not available, I may use sweet milk. In operating upon sweet milk I heat the same to a temperature of 90° F., and allow the same to stand at this temperature for ten to twelve hours, or until an acidity equal to about .6 % of lactic acid is developed.

After reaching the desired state of acidity, the milk must be at once cooled to a temperature of 45° F., since if allowed to stand at a temperature of 90° F., for a longer time, the fat would separate, in the form of butter, which would injure the product, since it would remove the fat content. The milk is then placed in a cylindrical agitator and is rapidly and vigorously agitated the agitating member being rotated at a speed of one hundred and fifty revolutions per minute for about twenty minutes, in order to produce a thorough and complete mixture of the ingredients.

Thereupon the product is ready to be placed into bottles, and iced ready for shipment and use. In this condition it will keep for several weeks, being maintained at a temperature below 45° F., during said time.

I call attention to the fact that no harmful ingredients are added to the milk at any stage, and nothing is removed from the milk, except the sugar which has been converted more or less into lactic acid.

I claim:—

1. A process of producing a nutritive milk beverage, said process comprising, maintaining untreated whole milk at a temperature of about 90° F., for ten to twelve hours, cooling said milk before separation of the butter fat occurs, to a temperature of about 45° F., and thoroughly agitating the same, while at said temperature.

2. A process of producing a milk beverage, which comprises maintaining untreated whole milk at a temperature of about 90° F., until an acidity equal to about .6 % of lactic acid has been secured, at once cooling the product to about 45° F., and thoroughly agitating, while at said temperature, in order to produce a homogeneous mixture containing all the fat of the whole milk.

In testimony whereof I affix my signature in presence of two witnesses.

BURT E. DUNN.

Witnesses:
NOAH D. BERRY,
WILL B. KOONS.

Copies of this patent may be obtained for five cents each, by addressing the "Commissioner of Patents, Washington, D. C."